(12) United States Patent
Kubota

(10) Patent No.: US 8,185,641 B2
(45) Date of Patent: May 22, 2012

(54) CLIENT SERVER SYSTEM AND CONNECTION METHOD

(75) Inventor: Mitsuru Kubota, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/968,573

(22) Filed: Dec. 15, 2010

(65) Prior Publication Data

US 2011/0083080 A1    Apr. 7, 2011

Related U.S. Application Data

(63) Continuation of application No. 12/186,963, filed on Aug. 6, 2008, now abandoned.

(30) Foreign Application Priority Data

Aug. 7, 2007   (JP) ................................. 2007-205658

(51) Int. Cl.
  *G06F 15/16*   (2006.01)
(52) U.S. Cl. ........... 709/228; 709/227; 709/239; 463/32
(58) Field of Classification Search .................... 709/228
  See application file for complete search history.

(56) References Cited

U.S. PATENT DOCUMENTS

| | | | | |
|---|---|---|---|---|
| 5,491,797 | A * | 2/1996 | Thompson et al. | 709/204 |
| 5,781,731 | A * | 7/1998 | Koreeda et al. | 709/204 |
| 6,154,782 | A * | 11/2000 | Kawaguchi et al. | 709/239 |
| 6,286,034 | B1 * | 9/2001 | Sato et al. | 709/204 |
| 6,856,962 | B2 * | 2/2005 | Yonemitsu | 705/8 |
| 7,171,448 | B1 * | 1/2007 | Danielsen et al. | 709/205 |
| 2002/0183117 | A1 * | 12/2002 | Takahashi et al. | 463/42 |
| 2004/0117194 | A9 * | 6/2004 | Lee et al. | 705/1 |
| 2004/0132000 | A1 * | 7/2004 | Dowdell et al. | 434/350 |
| 2004/0219504 | A1 * | 11/2004 | Hattie | 434/353 |
| 2005/0053905 | A1 * | 3/2005 | Sadler | 434/309 |
| 2005/0060750 | A1 | 3/2005 | Oka et al. | |
| 2005/0216549 | A1 * | 9/2005 | Amano et al. | 709/202 |

(Continued)

FOREIGN PATENT DOCUMENTS

JP   2003-87250   3/2003

(Continued)

OTHER PUBLICATIONS

Non-Final Office Action received in U.S. Appl. No. 12/186,963; Apr. 15, 2010.

(Continued)

*Primary Examiner* — Firmin Backer
*Assistant Examiner* — Hamza Algibhah
(74) *Attorney, Agent, or Firm* — AdvantEdge Law Group, LLC

(57) ABSTRACT

In at least one embodiment of the disclosure, a computing device comprises a network interface that receives terminal information corresponding to a terminal connected to a network. A storage device stores profile information defining that the terminal is permitted to connect to the computing device. A central processing unit refers to the received terminal information and the stored profile information and determines that the terminal is permitted to connect to the computing device. A display displays a participant display area. The display area shows a client name that corresponds to the terminal. An input mechanism accepts a user operation selecting the client name displayed in the participant display area to designate the terminal. The terminal provides image data to the computing device. The computing device supplies the image data provided by the terminal to an image display apparatus connected to the network.

18 Claims, 11 Drawing Sheets

| | MONDAY | TUESDAY | WEDNESDAY | THURSDAY | FRIDAY |
|---|---|---|---|---|---|
| FIRST PERIOD (10:00~11:00) | CLASS 1 | | | CLASS 6 | |
| SECOND PERIOD (11:00~12:00) | CLASS 2 | | CLASS 4 | | |
| THIRD PERIOD (13:00~14:00) | | CLASS 3 | CLASS 5 | | CLASS 7 |
| FOURTH PERIOD (14:00~15:00) | | | | | |

U.S. PATENT DOCUMENTS

| | | | |
|---|---|---|---|
| 2005/0287998 A1* | 12/2005 | Tonouchi | 455/416 |
| 2006/0007115 A1* | 1/2006 | Furuhashi et al. | 345/156 |
| 2006/0106938 A1* | 5/2006 | Dini et al. | 709/228 |
| 2006/0121433 A1* | 6/2006 | Adams | 434/323 |
| 2006/0195581 A1* | 8/2006 | Vaman et al. | 709/226 |
| 2006/0242254 A1* | 10/2006 | Okazaki et al. | 709/208 |
| 2007/0133774 A1* | 6/2007 | Fujimoto | 379/202.01 |
| 2008/0010347 A1* | 1/2008 | Houghton et al. | 709/205 |
| 2009/0328193 A1* | 12/2009 | Moore et al. | 726/15 |

FOREIGN PATENT DOCUMENTS

| | | |
|---|---|---|
| JP | 2004-274159 A | 9/2004 |
| JP | 2005-244548 A | 9/2005 |
| JP | 2007-060224 A | 3/2007 |

OTHER PUBLICATIONS

Final Office Action received in U.S. Appl. No. 12/186,963; Sep. 15, 2010.

* cited by examiner

| | MONDAY | TUESDAY | WEDNESDAY | THURSDAY | FRIDAY |
|---|---|---|---|---|---|
| FIRST PERIOD (10:00~11:00) | TEACHER M | | | | |
| SECOND PERIOD (11:00~12:00) | | | TEACHER O | | |
| THIRD PERIOD (13:00~14:00) | | TEACHER N | | | |
| FOURTH PERIOD (14:00~15:00) | | | TEACHER P | TEACHER Q | |

|  | MONDAY | TUESDAY | WEDNESDAY | THURSDAY | FRIDAY |
|---|---|---|---|---|---|
| FIRST PERIOD (10:00~11:00) | CLASS 1 |  |  | CLASS 6 |  |
| SECOND PERIOD (11:00~12:00) | CLASS 2 |  | CLASS 4 |  |  |
| THIRD PERIOD (13:00~14:00) |  | CLASS 3 | CLASS 5 |  | CLASS 7 |
| FOURTH PERIOD (14:00~15:00) |  |  |  |  |  |

FIG. 8A

| | CLASS 1 |
|---|---|
| 1 | STUDENT A |
| 2 | STUDENT B |
| 3 | STUDENT C |
| 4 | ... |
| ... | ... |

| | CLASS 2 |
|---|---|
| 1 | STUDENT F |
| 2 | STUDENT G |
| 3 | STUDENT H |
| 4 | ... |
| ... | ... |

| | CLASS 7 |
|---|---|
| 1 | ... |
| 2 | ... |
| 3 | ... |
| 4 | ... |
| ... | ... |

FIG. 8B

CLIENT SERVER SYSTEM AND CONNECTION METHOD

REFERENCE TO RELATED APPLICATIONS

This application is a continuation of U.S. patent application Ser. No. 12/186,963 filed Aug. 6, 2008, which claims priority from Japanese Patent Application No. 2007-205658 filed Aug. 7, 2007, each of which is hereby incorporated by reference in its entirety.

BACKGROUND

Recently, a conference system that connects plural personal computers and a projector via a network has been developed. Such a conference system enables selective projection of display screens of plural personal computers by a projector. This may be convenient in cases where users want to have a discussion while switching display of reference data saved in plural personal computers in accordance with the status of the conference. In the case where such a conference system includes plural projectors on the network, the user of each personal computer needs to carry out an operation to select a projector to be used for projection and then establish connection with this projector. For example, such a conference system in which one of plural connection destination candidates is selected and connected is disclosed in JP-A-2003-87250.

JP-A-2003-87250 discloses a technique in which, in association with group identification information showing a specific area and place to which a connection destination belongs, personal computers display candidates for the connection destination. Thus, a user can select a correction destination even when there are connection destination candidates of the same machine type or when there are many connection destination candidates.

However, in the technique disclosed in JP-A-2003-87250, the user must carryout an operation to select the connection destination each time, even in the case where the user of a certain personal computer gets connected to the same connection destination many times under a predetermined condition. For example, in the case where the conference system is used for a lesson at school, every time the lesson is given, which is given repeatedly in the same classroom at a predetermined time, if there are plural projectors on a local area network, each student must carryout an operation to select a projector installed in the classroom from the plural projectors. This must be done each time when getting connected to the projector installed in the classroom via the local area network from the personal computer allocated to the student. This selection operation may be troublesome to users, particularly when there are many choices as connection destinations. Moreover, in such a selection operation, it is possible for the students to mistakenly get connected to a projector installed in another classroom. Such problems are not limited to the conference system but are also common problems of server client systems in which a user repeatedly communicates with the same communication partner under a predetermined condition.

SUMMARY

In certain embodiments, in a server client system including a terminal and a server connected to each other via a network, the operation burden on the user at the time of connecting the terminal and the server may be reduced and convenience improved.

According to at least one embodiment, a server client system comprising at least one server and plural terminals are connected to each other via a network. The terminals and the server establish a connection that enables access to each other in accordance with a profile associating a temporal condition with a connection counterpart, stored in at least either the terminals or the server.

In the server client system of such a configuration, the terminals and the server establish a connection in accordance with a profile associating a temporal condition with a connection counterpart. As such, if the temporal condition is predefined, the time and labor for the users of the terminals or the server to select a connection counterpart may be eliminated. Thus, the operation burden on the users of the terminals or the server may be reduced.

In the server client system, the server may be provided in a plural number. The terminals may have a first storage unit that stores the profile associating the temporal condition with the plural servers as the connection counterpart, and a first communication unit that specifies a server with which a connection should be established to enable access in accordance with the profile, and automatically requests connection to enable access to the specified server.

In the server client system of such a configuration, the terminals may specify a server with which connection should be established in accordance with the profile, and automatically request connection to the server. As such, the users of the terminals do not have to carry out an operation to designate a server as a connection counterpart from the plural servers. Thus, the operation burden on the users of the terminals may be reduced. Moreover, the users of the terminals may be prevented from requesting a connection to a wrong connection destination.

In the server client system, the server may have a second storage unit that stores the profile associating the temporal condition with the plural terminals as the connection counterpart, and a second communication unit that establishes a connection to enable access only in the case where, when a request for a connection to enable access is received from one of the plural terminals, it is determined that the one of the plural terminals matches the profile.

In the server client system of such a configuration, the server establishes connection only in the case where, in response to a connection request from a terminal, it is determined that the terminal that has made the connection request matches the profile. Therefore, even if the users of the terminals request a connection to a wrong connection destination, connection is not established in response to this request. As such, the user of the server does not have to determine whether connection can be made or not, or to carry out a designation operation for that. Thus, the operation burden on the user of the server may be reduced.

In the server client system, the second communication unit may have a unit that, in the case where it is determined that the one of the plural terminals does not match the profile, sends a notification to reject connection to the one of the plural terminals.

In the server client system of such a configuration, in the case where it is determined in response to a connection request from a terminal that the terminal that has made the connection request does not match the profile, a notification to reject connection is sent to the terminal. As such, the user of the terminal can be notified that the user has made a wrong connection request unsuitable for the temporal condition. Thus, convenience to the user may be improved.

The server client system may be a conference system in which the server receives predetermined image data from the terminals, and by using the image data, displays a predetermined image on a predetermined image display device connected to the server.

In addition to the above configurations of the server client system, embodiments may also be configured as a connection method that establishes connection between the server and the terminals. Executable instructions may be embodied as a computer program, or in a storage and/or a recording medium.

BRIEF DESCRIPTION OF THE DRAWINGS

Various embodiments of the disclosure are described with reference to the accompanying drawings, wherein like numbers reference like elements.

FIG. 8A and FIG. 8B illustrate a specific example of an hourly profile and a class makeup profile.

DESCRIPTION OF EMBODIMENTS

Figure 1:
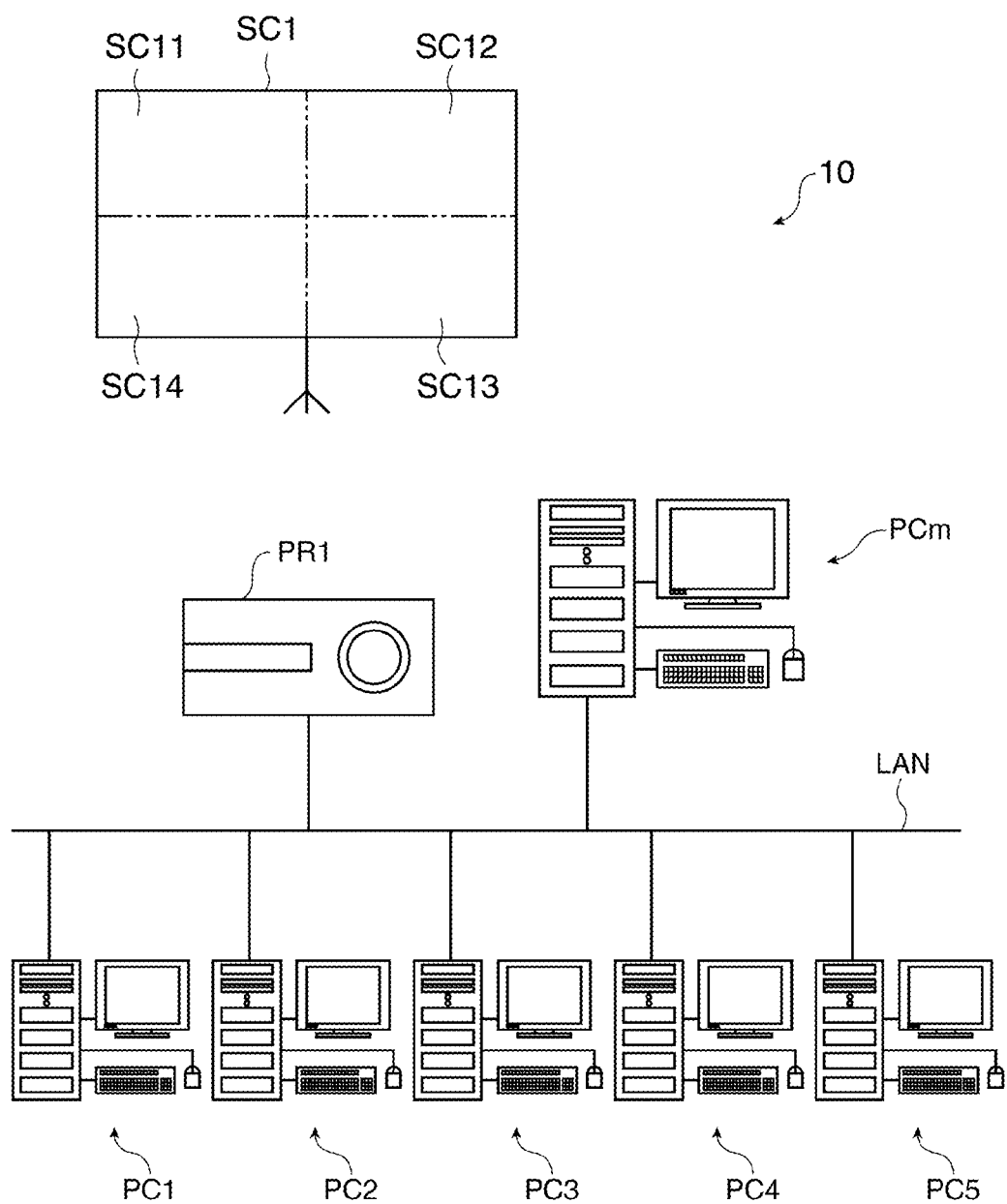
FIG. 1 illustrates the configuration of a conference system.

In the following description, reference is made to the accompanying drawings which form a part hereof, and in which are shown, by way of illustration, specific embodiments in which the disclosure may be practiced. It is to be understood that other embodiments may be utilized and structural or logical changes may be made without departing from the scope of the present disclosure. Therefore, the following detailed description is not to be taken in a limiting sense, and the scope of the present disclosure is defined by the appended claims and their equivalents.

Throughout the specification and claims, the following terms take at least the meanings explicitly associated herein, unless the context clearly dictates otherwise. The meanings identified below are not intended to limit the terms, but merely provide illustrative examples for use of the terms. The meaning of "a," "an," "one," and "the" may include reference to both the singular and the plural. Reference in the specification to "one embodiment" or "an embodiment" means that a particular feature, structure, or characteristic described in connection with the embodiment may be included in at least one embodiment of the disclosure. The meaning of "in" may include "in" and "on." The appearances of the phrases "in one embodiment" or "in an embodiment" in various places in the specification do not necessarily all refer to the same embodiment, but it may.

Several embodiments will sequentially be described under corresponding section headings below. Section headings are merely employed to improve readability, and they are not to be construed to restrict or narrow the present disclosure. For example, the order of description headings should not necessarily be construed so as to imply that these operations are necessarily order dependent or to imply the relative importance of an embodiment. Moreover, the scope of a disclosure under one section heading should not be construed to restrict or to limit the disclosure to that particular embodiment, rather the disclosure should indicate that a particular feature, structure, or characteristic described in connection with a section heading is included in at least one embodiment of the disclosure, but it may also be used in connection with other embodiments.

Various operations will be described as multiple discrete steps performed in turn in a manner that is most helpful in understanding the principles described herein. However, the order of description should not necessarily be construed so as to imply that these operations are necessarily order dependent. In particular, these operations may not need to be performed in the order of presentation, but they may.

Many of the functional units described in this specification have been labeled as units in order to more particularly emphasize their implementation independence. For example, a unit may be implemented as a hardware circuit comprising custom VLSI circuits or gate arrays, off-the-shelf semiconductors such as logic chips, transistors, or other discrete components. A unit may also be implemented in programmable hardware devices such as field programmable gate arrays, programmable array logic, programmable logic devices or the like.

Units may also be implemented in software for execution by various types of processors. An identified unit of executable code may, for instance, comprise one or more physical or logical blocks of computer instructions which may, for instance, be organized as an object, procedure, or function. Nevertheless, the executables of an identified unit need not be physically located together, but may comprise disparate instructions stored in different locations which, when joined logically together, comprise the unit and achieve the stated purpose for the unit.

Indeed, a unit of executable code may be a single instruction, or many instructions, and may even be distributed over several different code segments, among different programs, and across several memory devices. Similarly, operational data may be identified and illustrated herein within units, and may be embodied in any suitable form and organized within any suitable type of data structure. The operational data may be collected as a single data set, or may be distributed over different locations including over different storage devices, and may exist, at least partially, merely as electronic signals on a system or network.

A. Configuration of Conference System

A-1. Schematic Configuration of System

FIG. 1 illustrates the configuration of a conference system 10 according to at least one embodiment. The conference system 10 is an image display system that enables a projector to simultaneously display an image on the display screens of plural terminals. The conference system 10 includes terminals (e.g., computing devices such as computers PC1 to PC5), at least one server (e.g., a moderator computer PCm) and an image display device (e.g., a projector PR1) connected via a network. In at least one embodiment, the computers PC1 to PC5, the moderator computer PCm and the projector PR1 are connected via a local area network LAN. Although not shown, other devices equivalent to the moderator computer PCm and the projector PR1 are installed on the local area network LAN.

The method of connecting the computers PC1 to PC5, the moderator computer PCm and the projector PR1 is not, however, limited to the above form. Various connection methods can be set in accordance with the environment where these devices are used, required communication speed and so on. For example, the moderator computer PCm and the projector PR1 can be locally connected by a D-sub cable or USB cable. Moreover, these connections are not limited to wired connections but may be wireless connections. Furthermore, these devices can be connected via the Internet.

As will be described in more detail later, the projector PR1 can project and image on a screen SC1 and the moderator computer PCm can display a combined image formed as a result of combining four difference images into one screen image. Hereinafter, the areas corresponding to quadrisected displays on the screen SC1 are referred to as split screen forming areas SC11 to SC14, as shown in FIG. 1.

A-2. Schematic Configuration of Computers

Figure 2:
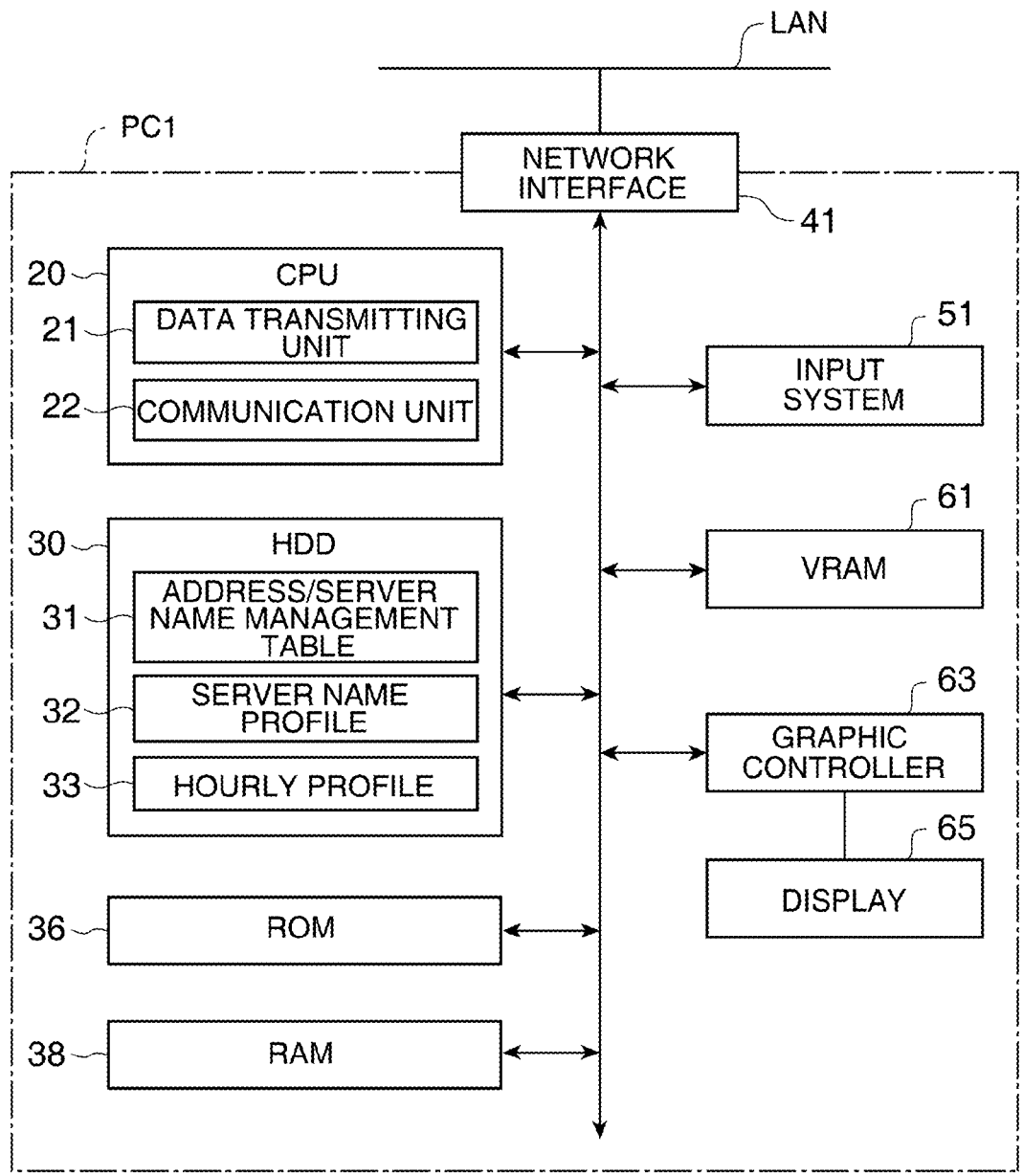
FIG. 2 illustrates the schematic configuration of participant computers.

The computer PC1 of the conference system 10 is a personal computer having a predetermined program installed therein and is provided to be used by a student A. FIG. 2 shows a schematic configuration of the computer PC1. The computers PC2 to PC5 provided to be used by students B to E have a configuration similar to that of the computer PC1 and therefore will not be described further in more detail. As shown in FIG. 2, the computer PC1 has a CPU 20, a hard disk drive 30, a ROM 36, a RAM 38, a network interface 41, an input system 51, a VRAM 61, a graphic controller 63, and a display 65, which are connected to each other by a bus.

The CPU 20 expands firmware and OS stored in the hard disk drive 30 and the ROM 36 into the RAM 38 and executes these, thereby controlling the computer PC1. The CPU 20 also executes a program stored in the hard disk drive 30 and as such functions as a data transmitting unit 21 and a communication unit 22. This functional part will be described in more detail later.

On the hard disk drive 30, the IP address of the computer PC1 is stored and also storage areas for storing an address/server name management table 31, and profile(s) (e.g., a server name profile 32 and an hourly profile 33) are secured. These parts will be described in more detail later. These storage areas are not limited to the hard disk drive 30 and can be secured in, for example, a rewritable non-volatile memory such as an EEPROM.

The network interface 41 is an interface for connection to the local area network LAN. The computer PC1 is connected to the local area network LAN via the network interface 41.

The input system 51 includes a keyboard and a pointing device (here, a mouse). The graphic controller 63 displays an image to be displayed on the display 65 by using the VRAM 61 as a buffer.

A-3. Schematic Configuration of Moderator Computer

Figure 3:
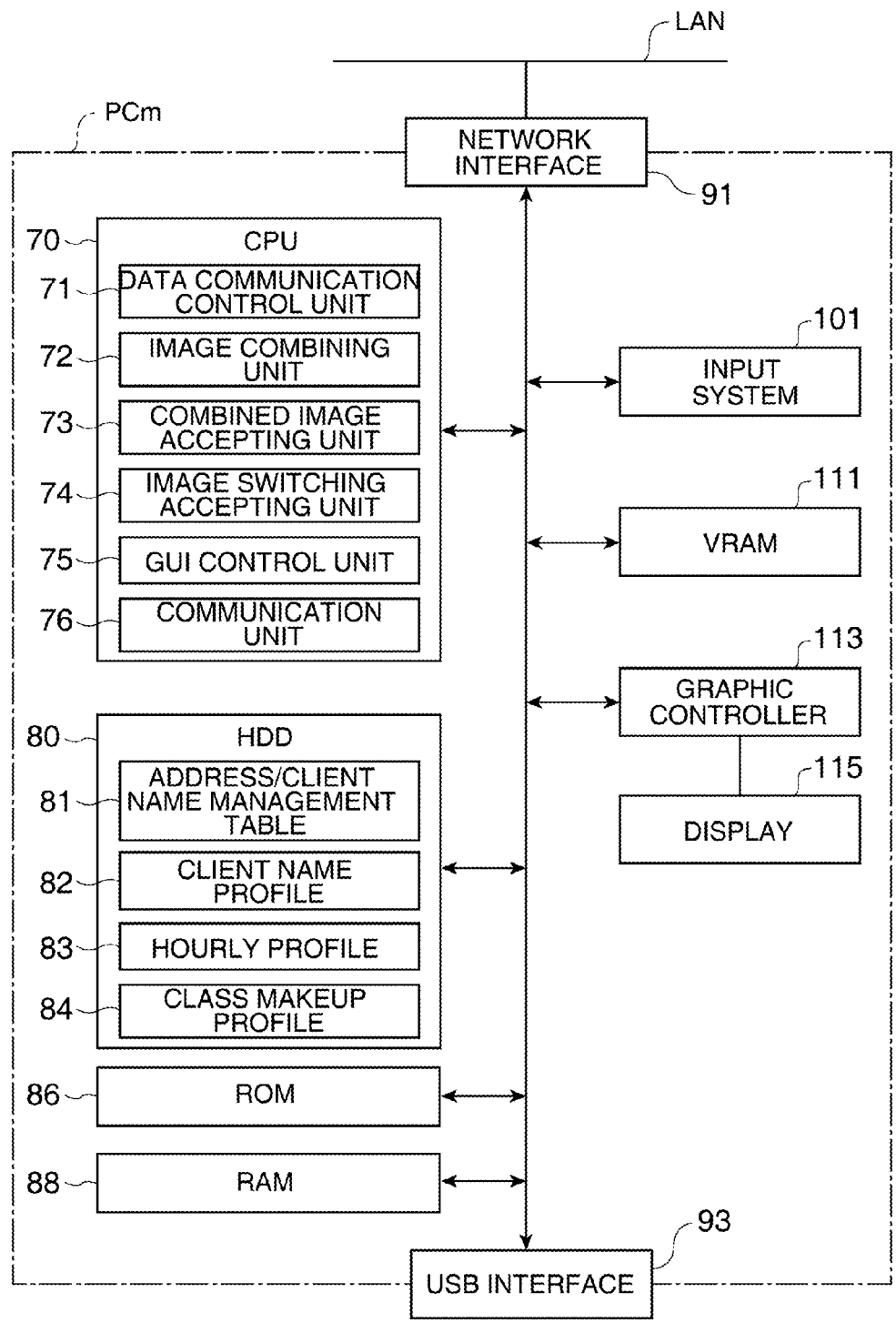
FIG. 3 illustrates the schematic configuration of a moderator computer.

The moderator computer PCm, which constitutes the conference system 10 is a personal computer having a predetermined program installed therein and is provided to be used by a teacher M. In at least one embodiment, this moderator computer PCm is equivalent to a server. FIG. 3 illustrates the schematic configuration of the moderator computer PCm. As depicted in FIG. 3, the moderator computer PCm has a CPU 70, a hard disk drive 80, a ROM 86, a RAM 88, a network interface 91, a USB interface 93, an input system 101, a VRAM 111, a graphic controller 113, and a display 115, which are connected to each other by a bus.

The CPU 70 executes a program stored on the hard disk drive 80 and thus functions as a data communication control unit 71, an image combining unit 72, a combined image accepting unit 73, an image switching accepting unit 74, a GUI control unit 75, and a communication unit 76.

In the hard disk drive 80, the IP address of the moderator computer PCm is stored and also storage areas for storing an address/client name management table 81, and profile(s) (e.g., a client name profile 82, an hourly profile 83 and a class makeup profile 84) are secured. Also plural GUI programs are stored, which will be described later. These parts will be described in more detail later. These storage areas are not limited to the hard disk drive 80 and can be secured in an EEPROM, which is a rewritable non-volatile memory.

The USB interface 93 is a USB-style interface for connection to the projector PR1. The moderator computer PCm can be connected to the projector PR1 via a USB cable.

The ROM 86, the RAM 88, the network interface 91, the input system 101, the VRAM 111, the graphic controller 113 and the display 115 have the same configuration as in the computers PC1 to PC5 and therefore will not be described in further detail.

A-4. Schematic Configuration of Projector

Figure 4:
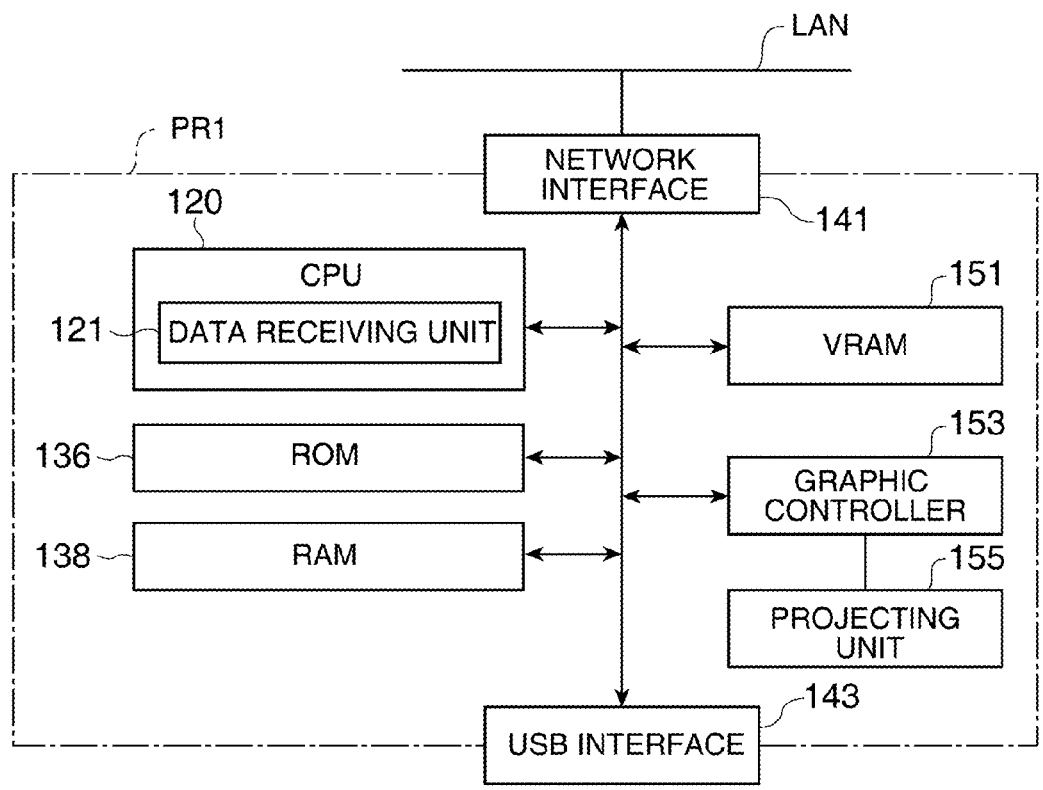
FIG. 4 illustrates the schematic configuration of a projector.

The projector PR1 of the conference system 10, is a versatile projector without having any special function for split screen display. FIG. 4 illustrates a schematic configuration of the projector PR1. As depicted in FIG. 4, the projector PR1 has a CPU 120, a ROM 136, a RAM 138, a network interface 141, a USB interface 143, a VRAM 151, a graphic controller 153, and a projecting unit 155, which are connected to each other by a bus.

The CPU 120 expands a program stored in the ROM 136 into the RAM 138 and executes the program, thereby functioning as a data receiving unit 121. This functional part will be described in further detail later.

The network interface 141 is an interface for connection to the local area network LAN. The projector PR1 is connected to the local area network LAN via the network interface 141. The USB interface 143 is a USB-style interface for connection to the moderator computer PCm. The projector PR1 can also be connected to the moderator computer PCm via a USB cable.

The graphic controller 153 causes the projecting unit 155 to display an image by using the VRAM 151 as a buffer. The projecting unit 155 is a liquid crystal projection mechanism. By projecting light transmitted through a liquid crystal panel for RGB, the projecting unit 155 displays an image on the screen SC1. Although a liquid crystal system is disclosed in this embodiment, it is not limited to such as various other systems may be used such as a CRT system, DLP system, LCOS system or GLV system.

B. Method of Using Conference System

At least one method of using the conference system 10 will be described in more detail based on the conference system 10 being used for a lesson at a school. In the following example, it is assumed that a teacher M, who is a facilitator of the lesson, carries out a lesson by operating the moderator computer PCm to carry out full-screen display of one of display screen images PCT1 to PCT5 displayed on the displays 65 of the computers PC1 to PC5 used by students A to E and a display screen image PCTm displayed on the display 115 of the moderator computer PCm, or split screen display of selected display screen images of the display screen images PCT1 to PCT5 and PCTm, onto the screen SC1 via the projector PR1. The display screen images PCT1 to PCT5 and PCTm may be images showing reference materials prepared by each of the students A to E and the teacher M. The students A to E and the teacher M may explain their own prepared reference materials in accordance with the lesson.

B-1. Initial Setting For Use

Initial setting for using the conference system 10 will now be described. Initial setting in this embodiment is for the computers PC1 to PC5 and the moderator computer PCm to carryout communications. This initial setting processing is started when the teacher M first starts up predetermined software in the moderator computer PCm, and then the students A to E start up predetermined software in the computers PC1 to PC5, respectively.

When the above software has started up, the CPU 20 of the computers PC1 to PC5 issues a search command and simultaneously communicates the search command in the local area network LAN. Meanwhile, the CPU 70 of the moderator computer PCm, having received the search command, sends back the computer name (e.g., teacher name) and IP address of the moderator computer PCm to the computers PC1 to PC5. The CPU 20 of the computers PC1 to PC5 receives this computer name and IP address and registers this data to address/server name management table 31.

The CPU 20 of the computers PC1 to PC5 transmits the computer names (e.g., student names) and IP addresses of the computers PC1 to PC5 to the moderator computer PCm. The CPU 70 of the moderator computer PCm receives these computer names and IP addresses and registers this data to the address/client name management table 81.

The computers PC1 to PC5 specify the IP address of the moderator computer PCm by referring to the server name profile 32 in which the teacher name has been registered and the above address/server name management table 31, and carry out communications. Similarly, the moderator computer PCm specifies the IP addresses of the computers PC1 to PC5 by referring to the client name profile 82 and the address/client name management table 81, and carries out communications. In at least one embodiment, such initial setting is carried out every time the above software is started up in order to address the case where a new student is added or an IP address is changed. However, the update of this initial setting may be omitted in the case where there is no change in registration contents for a predetermined period. Moreover, the above initial setting may also be input by the teacher M and the students A to E using the input system 51 and the input system 101.

In at least one embodiment, it is assumed that the IP addresses of the computers PC1 to PC5 and of the moderator computer PCm are stored on the hard disk drives 30 and 80, respectively, through prior setting by the students A to E and the teacher M. However, the IP addresses are not limited to such a configuration. For example, before the above initial setting, a DHCP server on the local area network LAN may allocate an IP address to each of the computers PC1 to PC5 and the moderator computer PCm in response to an IP address request that is simultaneously communicated from the computers PC1 to PC5 and the moderator computer PCm.

B-2. Connection Processing

Figure 5:
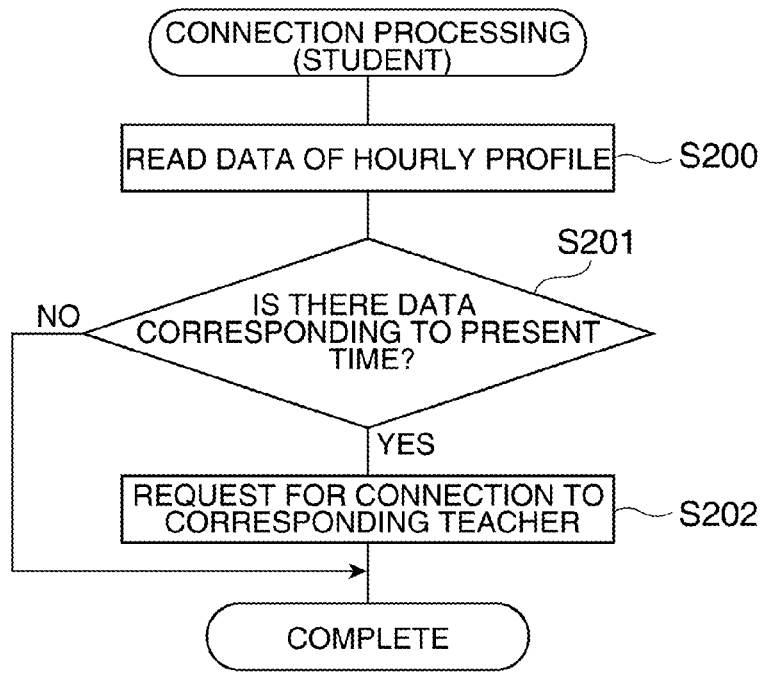
FIG. 5 is a flowchart illustrating a flow diagram on the side of the participant computers, of connection processing between the participant computers and the moderator computer.
Figures 6, 7:
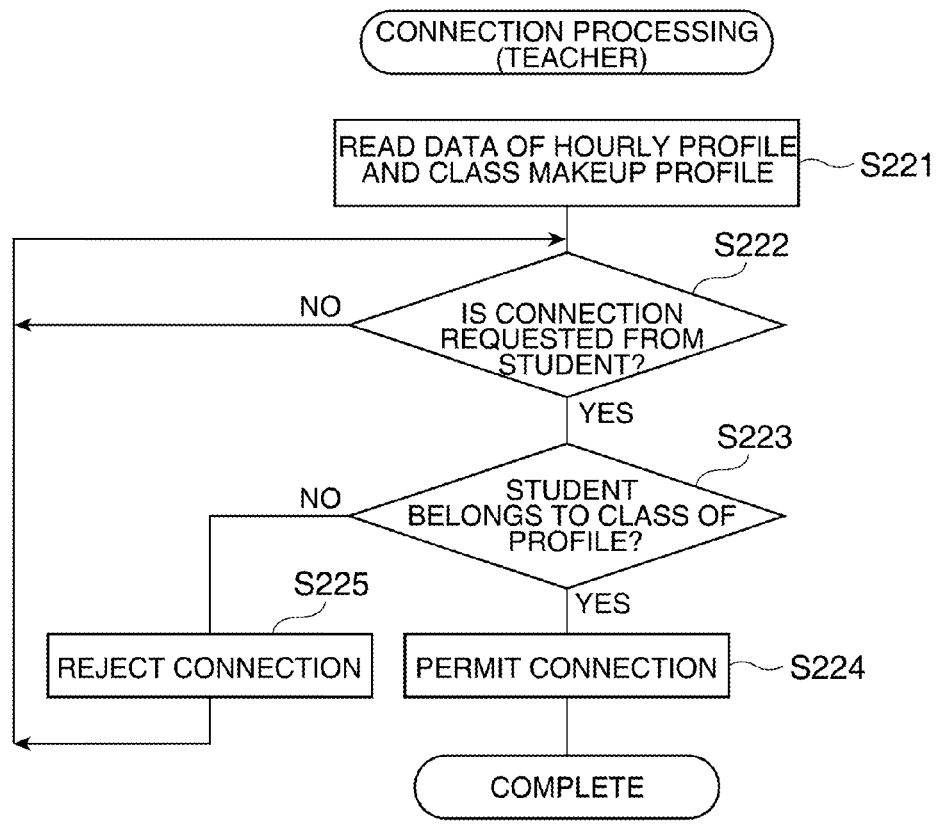
FIG. 6 is a flowchart illustrating a flow diagram on the side of the moderator computer, of connection processing between the participant computers and the moderator computer.
FIG. 7 illustrates a specific example of an hourly profile.

FIG. 5 and FIG. 6 show flow diagrams of connection processing between the computers PC1 to PC5 and the moderator computer PCm. Describing a method by reference to a flow diagram enables one skilled in the art to develop programs, including instructions to carry out the processes and methods on suitably configured computer systems and electronic devices. In various embodiments, portions of the operations to be performed by an electronic device or computer system may constitute circuits, general purpose processors (e.g., micro-processors, micro-controllers, an ASIC, or digital signal processors (DSPs)), special purpose processors (e.g., application specific integrated circuits or ASICs), firmware (e.g., firmware that is used by a processor such as a micro-processor, a micro-controller, and/or a digital signal processor), state machines, hardware arrays, reconfigurable hardware, and/or software made up of executable instructions. The executable instructions may be embodied in firmware logic, reconfigurable logic, a hardware description language, a state machine, an application-specific integrated circuit (ASIC), or combinations thereof.

With respect to various embodiments using a software implementation (e.g., a hardware simulator), at least one of the processors of a suitably configured terminal or server executes the instructions from a storage and/or recording medium. The computer-executable instructions may be written in a computer programming language or executable code. If written in a programming language conforming to a recognized standard, such instructions may be executed on a variety of hardware platforms and may interface with a variety of operating systems. Although the various embodiments are not described with reference to any particular programming language, it may be appreciated that a variety of programming languages may be used to implement the teachings of the embodiments as described herein. Furthermore, it is common in the art to speak of software in one form or another (e.g., program, procedure, process, application, etc.) as taking an action or causing a result. Such expressions are merely a shorthand way of saying that execution of the software causes the processor of the terminal or server to perform an action or to produce a result.

FIG. 5 shows processing on the side of the computers PC1 to PC5, which is carried out by the CPU 20 as the processing at the communication unit 22. FIG. 6 shows processing on the side of the moderator computer PCm, which is carried out by the CPU 70 as the processing at the communication unit 76.

In the following example, it is assumed that the students A to E have their respective exclusive-use computers PC1 to PC5 allocated. These flow diagrams of processing are started when the above software has started up and initial setting is complete.

As the connection processing is started, first, the CPU 20 of the computers PC1 to PC5 reads the hourly profile 33 stored on the hard disk drive 30 as shown in FIG. 5 (step S200).

Turning now to FIG. 7, and with continued reference to FIG. 5, a specific example of this hourly profile 33 is illustrated. The hourly profile 33 is a profile in which a connection destination is set by time. As illustrated, each of the lessons in the first to fourth periods on days of the week Monday through Friday is associated with the name of the teacher in charge of the lesson which the students are to attend. As such, the hourly profile 33 is a lesson timetable for the students A to E. For example, the first period on Monday is defined as a lesson of the teacher M, the third period on Tuesday is a lesson of the teacher N, and so on. This hourly profile 33 is inputted in advance by the students A to E using the input system 51 and so on, and is stored on the hard disk drive 30.

Having read the hourly profile 33, the CPU 20 compares the present time with the hourly profile 33 and determines whether there is profile data corresponding to the present time (step S201).

If there is corresponding profile data as a result of the determination (YES in step S201), a lesson to attend is scheduled in that time period. As such, the CPU 20 requests connection to the computer (in this embodiment, the moderator computer PCm) of the teacher (in this embodiment, the teacher M) corresponding to this time period (step S202). Although not shown in FIG. 1, each of the teachers N to Q shown in FIG. 7 utilizes a moderator computer connected to the local area network LAN, like teacher M. In time periods when other lessons are scheduled, a connection request is made to the computers of the teachers N to Q. Alternatively, if there is no corresponding profile data (NO in step S201), no lesson is scheduled in that time period, and the processing ends.

In the moderator computer PCm, when the connection processing is started, the CPU 70 reads the hourly profile 83 and the class makeup profile 84 stored on the hard disk drive 80, as illustrated in FIG. 6 (step S221).

Turning now to FIG. 8A, and with continued reference to FIG. 6, a specific example of the hourly profile 83 is depicted. The hourly profile 83 is a profile in which a connection destination is set by time. As illustrated, each of the lessons in the first to fourth periods on Monday through Friday is associated with the name of the class where the teacher gives a lesson in the time period. As such, the hourly profile 83 is a timetable of lessons that the teacher M is to give. For example, the first period on Monday is defined as a lesson for a class 1, the second period on Monday is a lesson for a class 2, and so on.

FIG. 8B shows a specific example of the class makeup profile 84. The class makeup profile 84 is a profile in which the makeup of the class as a lesson attendance unit is set. Here, each of the classes 1 to 7 is associated with the names of students who make up the class.

The hourly profile 83 and the class makeup profile 84 are inputted in advance by the teacher M using, for example, the input system 101, and is stored on the hard disk drive 80.

Having read the hourly profile 83 and the class makeup profile 84, the CPU 70 continuously determines whether there is a connection request from the students A to E, that is, the computers PC1 to PC5 (step S222).

If there is no connection request as a result of the determination (NO in step S222), the CPU waits until a connection request comes. Alternatively, if it is determined that there is a connection request (YES in step S222), the CPU 70 determines whether the student who has sent the connection request is a student belonging to the class corresponding to the present time defined in the hourly profile 83, by referring to the hourly profile 83 and the class makeup profile 84 (step S223).

If the student belongs to the class as a result of the determination (YES in step S223), the CPU 70 permits connection in response to the connection request from the student and establishes connection (step S224). Alternatively, if the student does not belong to the class, this student is not entitled to attend the lesson of this time period. As such, the CPU 70 rejects connection in response to the connection request from the student (step S225) and returns the processing to step S222 to stand by for a new connection request from another student. In this manner, the connection between the computers PC1 to PC5 and the moderator computer PCm may be automatically established via the local area network LAN.

In this embodiment, it is assumed that the students A to E have their own exclusive-use computers PC1 to PC5. However, in the case where multiple students share a computer, the CPU 20 may allow the students to input their individual student names before the above step S200, and the student names may be transmitted together with a connection request to the moderator computer PCm in the above step S202.

In this embodiment, the profile associating temporal conditions (i.e. time conditions) with connection destinations is stored in both the computers PC1 to PC5 as terminals, and the moderator computer PCm as a server. However, in alternative embodiments, the profile may be stored only in the computers PC1 to PC5 or in the moderator computer PCm. Even in the embodiment(s) where the profile is stored only in the moderator computer PCm, if the computers PC1 to PC5 are configured to automatically and simultaneously communicate a connection request onto the local area network LAN, the moderator computer PCm refers to the hourly profile 83 and the class makeup profile 84 and gives connection permission only to the computers PC1 to PC5 that match these profiles. As such, it is possible to automatically establish connection between the computers PC1 to PC5 and the moderator computer PCm.

In the case of rejecting connection in the above step S225, the moderator computer PCm may be configured to send a notification that the connection is rejected to the appropriate computers PC1 to PC5 from which the connection is rejected. In this manner, the students A to E may quickly learn they are not entitled to attend the particular lesson.

B-3. Split Display Screen Switching Processing

Figure 9:
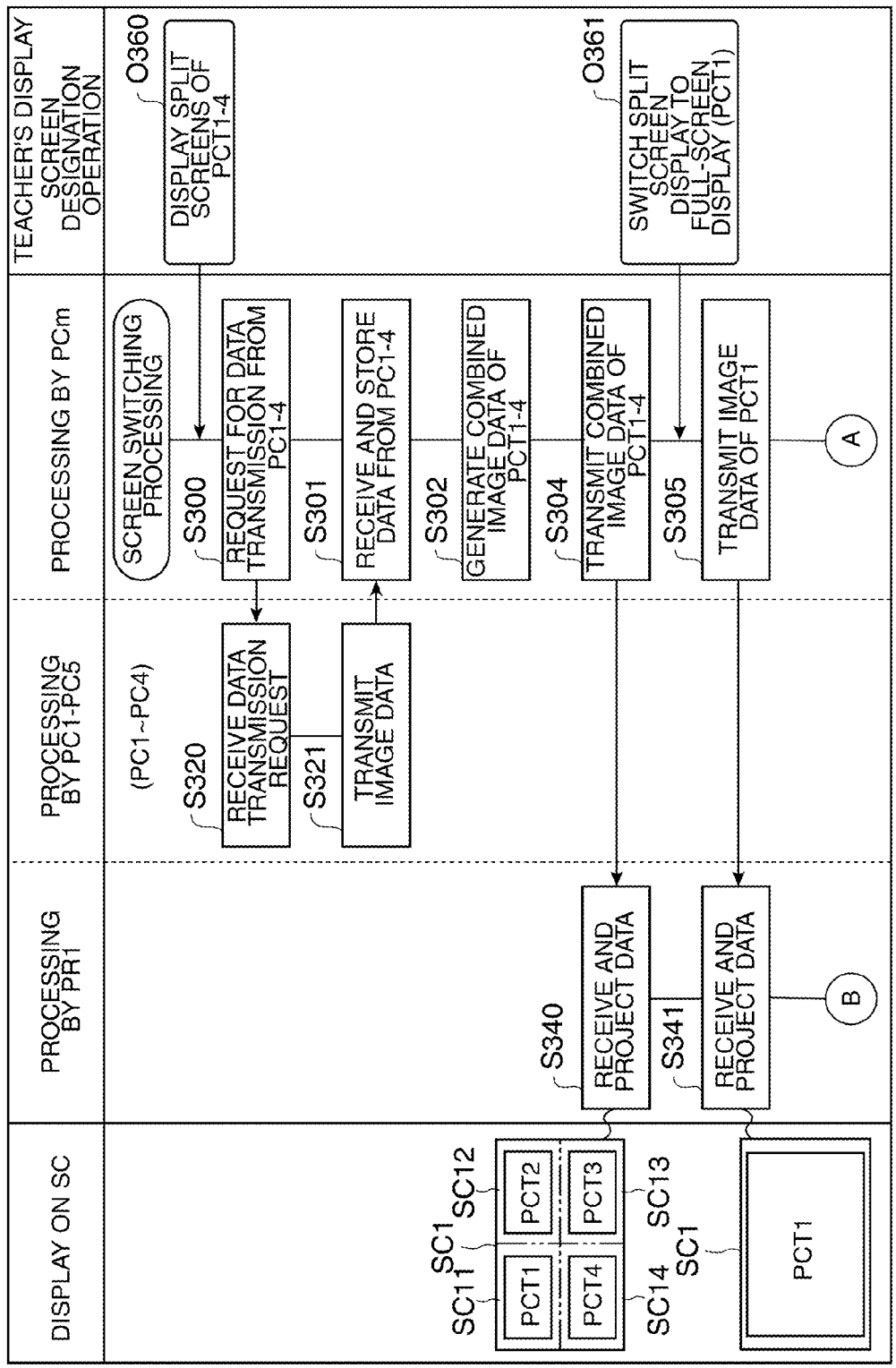
FIG. 9 illustrates an exemplary flow diagram of split display screen switching processing to switch a display image by using the conference system in accordance with certain embodiments.
Figure 10:
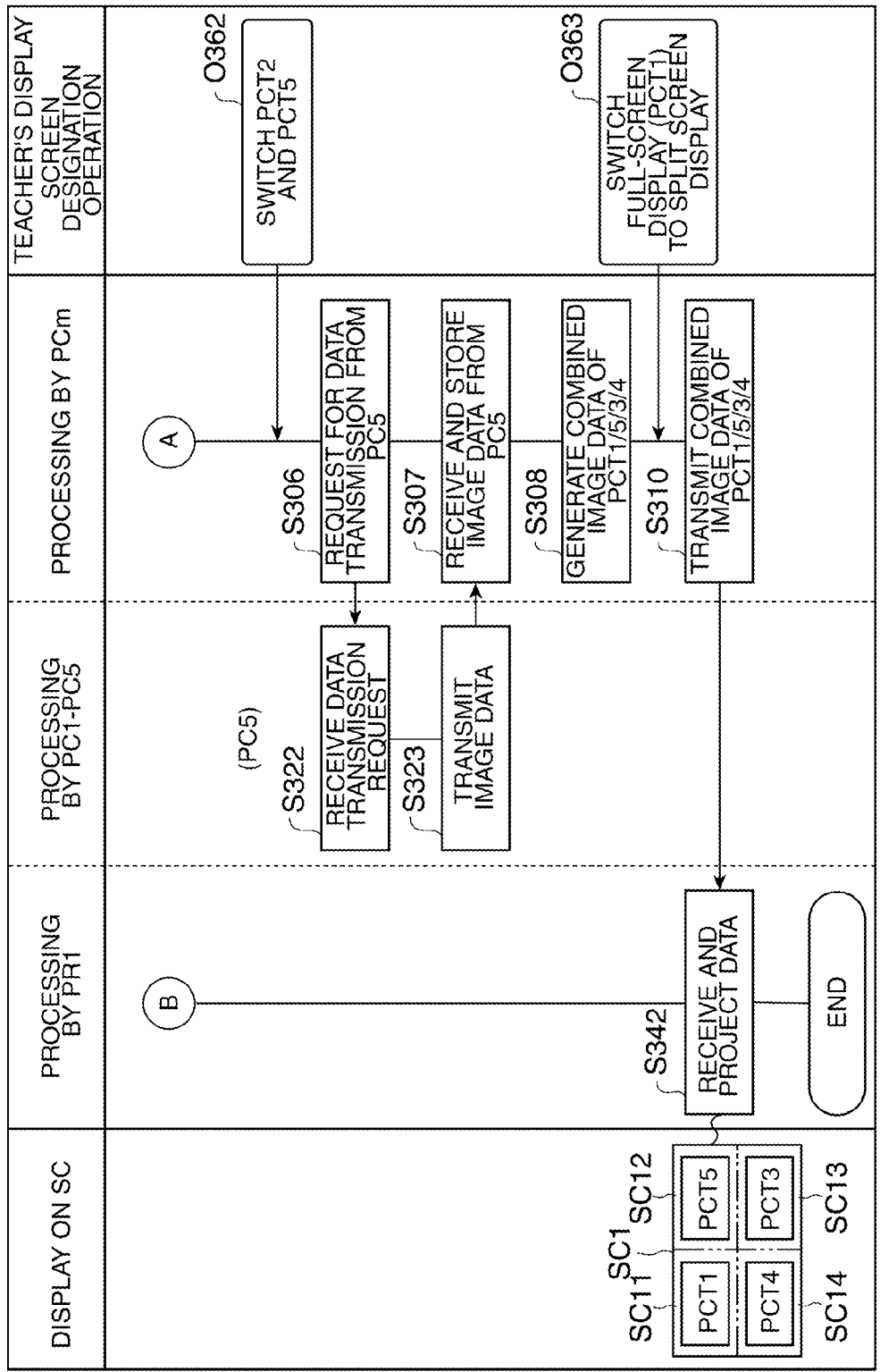
FIG. 10 illustrates an exemplary flow diagram of split display screen switching processing to switch a display image by using the conference system in accordance with certain embodiments.

FIG. 9 and FIG. 10 illustrate, in accordance with at least one embodiment, an exemplary flow diagram of split display screen switching processing in which split display images on the display screens of the computers PC1 to PC5 are projected on the screen SC1 and the display images are switched by using the conference system 10. As illustrated, the right column in FIG. 9 and FIG. 10 shows an operation by the teacher M to designate a display image to be projected on the screen SC1 by using the moderator computer PCm. The middle columns in FIG. 9 and FIG. 10 show processing by the moderator computer PCm in response to the operation by the teacher M shown in the right column, and processing by the computers PC1 to PC5 and the projector PR1 in response to the processing by the moderator computer PCm. The left column in FIG. 9 and FIG. 10 shows an image projected on the screen SC1 in each stage of the middle columns.

This processing is started as the teacher M carries out an operation to designate a projection image to the moderator computer PCm. In at least one embodiment, this is a designation operation to cause the projector PR1 to project an image of quadrisected display including the display screen images PCT1 to PCT4 of the computers PC1 to PC4 (operation O360).

Figure 11:
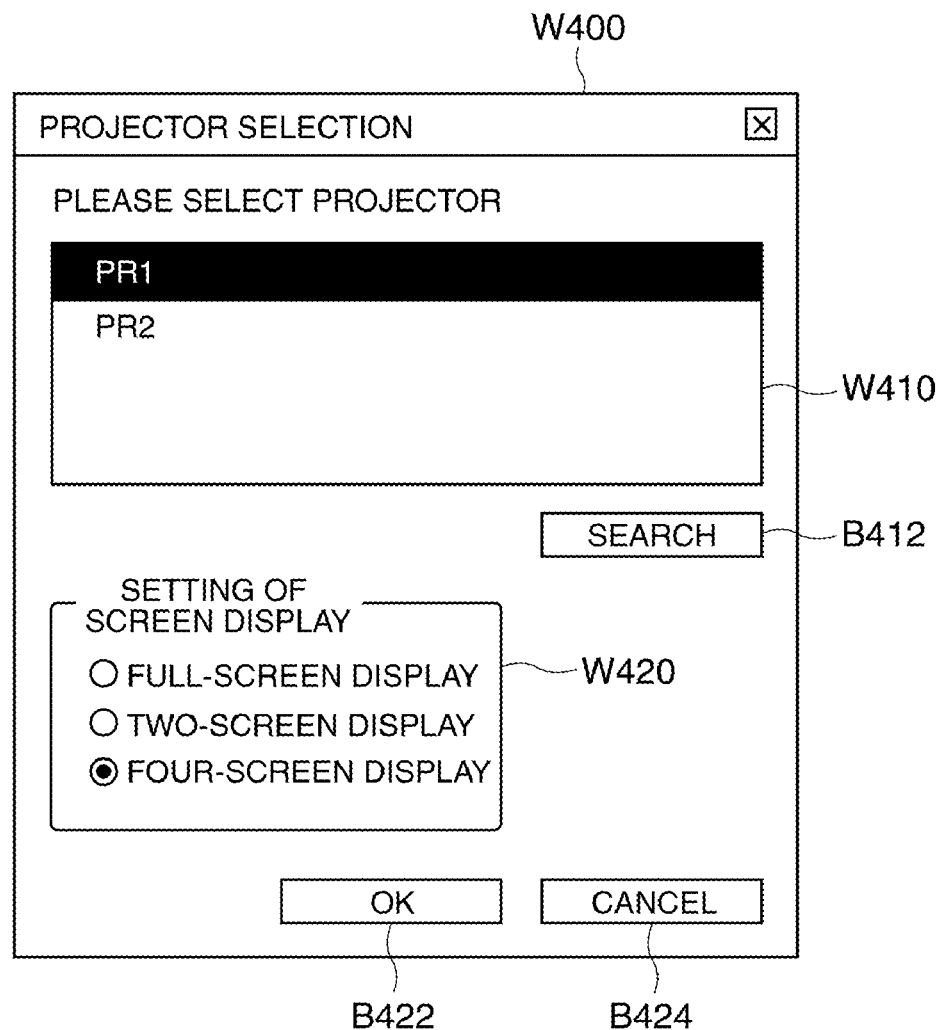
FIG. 11 illustrates an example of a projector selection window to carry out setting of a projector and a screen display.

The designation of the operation O360 may be carried out using the input system 101 of the moderator computer PCm and a GUI (graphical user interface) displayed on the display 115. Hereinafter, this GUI will be described with reference to a specific example. In the moderator computer PCm, when the above software is started up, the CPU 70 causes the display 115 to display a window for selecting a projector and for setting the screen display, by using the graphic controller 113. As an example of this window, FIG. 11 depicts a projector selection window W400. The projector selection window W400 may include a projector selection sub-window W410 and a screen display setting sub-window W420.

In the projector selection sub-window W410, a list of projectors connected to the moderator computer PCm may be shown. The projectors, as shown, have their connections to the moderator computer PCm automatically recognized by plug-and-play. FIG. 11 depicts the state where the projector PR1, of the connected projectors PR1 and PR2, is selected as the projector to be used. Although the projector PR2 is not shown in FIG. 1, this example depicts the embodiment(s) where there is another projector on the local area network LAN connected by the same configuration as the projector PR1. In the projector selection sub-window W410, if there are projectors on the local area network LAN, the CPU 70 searches for the projectors at the time of start-up of the above software and the result of the search is displayed in the above list of projectors. However, it may also be possible to re-search for the connected projectors by, for example, clicking a search button B412.

In the screen display setting sub-window W420, options for display method of an image that the projector PR1 should project onto the screen SC1 are shown. In the example of FIG. 11, full-screen display, two-screen display, and four-screen display are shown as options, and of these, the four-screen display is selected. The two-screen display and the four-screen display are display methods for providing simultaneous split display of different images. When one of these display methods is selected, the split display and the full-screen display may be easily switched, as will be described in more detail later. The options of split screen display are not limited to the two-screen display and the four-screen display shown as examples. For example, the split screen display may include a three-screen display or a display of five or more screens. In the two-screen display, various formats of the split screen may be selected at the same time, such as the layout of the split screen such as whether two screens are to be arrayed laterally or longitudinally, and the size of each split screen.

Figure 12:
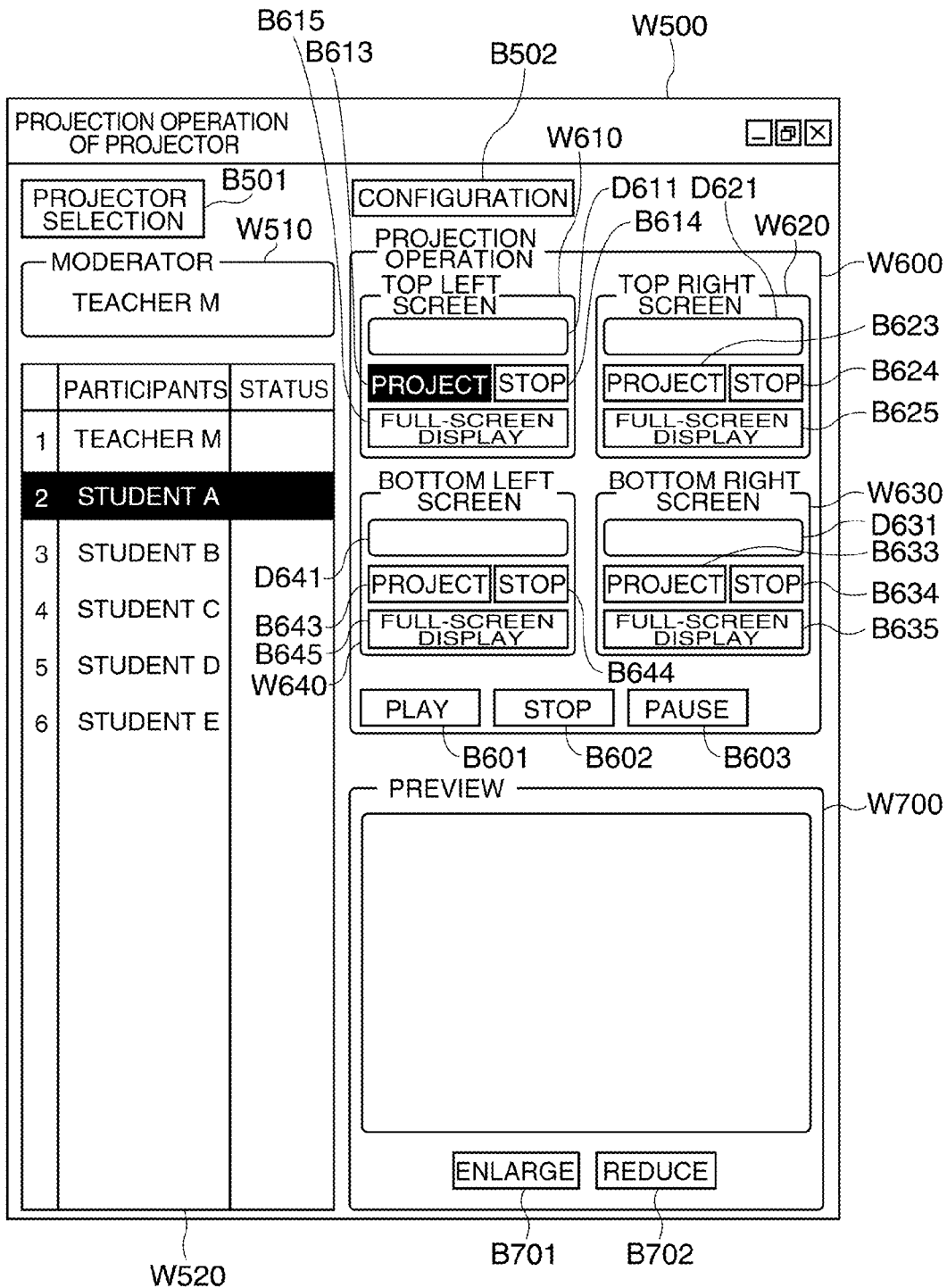
FIG. 12 illustrates an example of a projector projection operation window to perform a projector projection operation.

As illustrated, when the projector PR1 and the four-screen display are selected and an OK button B422 is clicked, the CPU 70, in the form of processing at the GUI control unit 75, reads a GUI program corresponding to the selected four-screen display from plural types of GUI programs stored on the hard disk drive 80, and causes the display 115 to display a projector projection operation window by using the graphic controller 113. As an example of this window, FIG. 12 shows a projector projection operation window W500. The projector projection operation window W500 may include a moderator display sub-window W510, a participant display sub-window W520, a projection operation sub-window W600, and a preview sub-window W700.

In the moderator display sub-window W510, the name of the predetermined user of the moderator computer PCm may be shown as the moderator name. In embodiments where multiple users share the moderator computer PCm, the moderator name may be inputted when the software is started up.

In the participant display sub-window W520, a list of computers that are projectable by the projector PR1 is shown together with their status. The projectable computers include the moderator computer PCm and computers having connection established with the moderator computer PCm in the above step S224. As illustrated, for ease in identification, the user names of the computers are shown as the list of computers. The status in this embodiment refers to information about whether the computer is now being projected or not. In the example of FIG. 12, the moderator name "teacher M" is shown in W510 and "teacher M" and "students A to E" of the computers PC1 to PC5 are shown in the participant display sub-window W520. The displays in the moderator display sub-window W510 and the participant display sub-window W520 may contain any information that enables univocal identification of the moderator or participants. Computer names, machine type names and so on may also be used for these displays.

The projection operation sub-window W600 has a top left screen sub-window W610, a top right screen sub-window W620, a bottom right screen sub-window W630, and a bottom left screen sub-window W640. The four screen sub-windows are provided because "four-screen display" is selected in the screen display setting sub-window W420. If "two-screen display" is selected, the number of screen sub-windows is two. If "full-screen display" is selected, the number of screen sub-windows is one. That is, the number and layout of screen sub-windows provided in the projection operation sub-window W600 correspond to the split display screen displayed on the screen SC1. In at least one embodiment, the screen sub-windows correspond to the number of splits and layout of the split display screen. However, the screen sub-windows are not limited to such a configuration and may correspond to various display forms of the split display screen. For example, in the embodiment(s) where the split screen forming areas that constitute the split display screen have a screen frame in different colors from each other, the color of the screen sub-windows may correspond to the color of the screen frames. In another example, where the split screen forming areas have different shapes and sizes from each other, the shape and size of the screen sub-windows may correspond to the shape and size of the split screen forming areas.

The top left screen sub-window W610 has a projection user display part D611, a projection button B613, a stop button B614, and a full-screen display button B615. The projection user display part D611 is an area to display the user of the computer corresponding to the image displayed in the top left split screen forming area (split screen forming area SC11). The projection button B613 and the stop button B614 are operation buttons that give instructions to project a predetermined image in the top left split screen forming area independently of the other split screen forming areas, and to stop the projection. For example, as illustrated in FIG. 12, if "student A" is selected in the participant display sub-window W520 and then the projection button B613 is clicked in the top left screen sub-window W610, "student A" is displayed in the projection user display part D611 and the display screen image PCT1 of the computer PC1 used by the student A can be displayed in the split screen forming area SC11, which is the top left screen part of the screen SC1. If the stop button B614 is clicked, the display of "student A" vanishes from the projection user display part D611 and the display screen image PCT1 vanishes from the split screen forming area SC11. The operation to select "student A" in the participant display sub-window W520 and to allocate the display screen image PCT1 to the split screen forming area SC11 in the projection operation sub-window W600 may also be carried out by drag and drop of "student A" from the participant display sub-window W520 into W610, instead of clicking the projection button B613.

The full-screen display button B615 is a button to switch the quadrisected display screen and the full-screen display. For example, if the full-screen display button B615 is clicked in the embodiment where the quadrisected display screen is shown on the screen SC1, the image displayed in the top left split screen forming area can be switched to the full-screen display. Then, as the full-screen display button B615 is clicked again, the full-screen display can be switched to the previous quadrisected display screen. The top right, bottom right and bottom left screen sub-windows W620 to W640 are configured similarly to the top left screen sub-window W610 and therefore will not be described in further detail.

The projection operation sub-window W600 also has a PLAY button B601, a STOP button B602, and a PAUSE button B603 to operate projection by the projector PR1. These buttons are for collectively operating images sent to the projector PR1 from the moderator computer PCm. These buttons can collectively carry out projection of images by the projector PR1, stop the projection, or pause the images, regardless of whether the display on the screen SC1 is split display or full-screen display.

The preview sub-window W700 is an area where, when the students A to E displayed in the participant display sub-window W520 are selected, preview of the display screen images PCT1 to PCT5 corresponding to the selected students A to E is shown regardless of the projected image by the projector PR1. It is also possible to enlarge or reduce the display by using an enlargement button B701 and a reduction button B702. In this preview, for example, image data with a reduced data size are used which are received from the computer PC1 to PC5 in response to a data transmission request sent from the moderator computer PCm to PC1 to PC5 when the students A to E are selected in the participant display sub-window W520.

The projector projection operation window W500 having these sub-windows also has a projector selection button B501 and a configuration button B502. The projector selection button B501 is a button to carry out selection of a projector and setting of the screen display again. When this button is clicked, the projector selection window W400 is displayed. Therefore, while using the conference system 10, the teacher M can click the projector selection button B501 to have the projector selection window W400 shown, and can select a projector or change the setting of the screen display. The configuration button B502 is a button to carry out setting with respect to whether input history to the projector PR1 is used or not.

When the projection selection button B501 is clicked as described above to have the projector selection window W400 shown and the setting of the display screen is changed, the subsequently shown projector projection operation window W500 is changed in accordance with that change. For example, if an operation to change from the four-screen display to the two-screen display is carried out in the projector selection window W400, the CPU 70 reads a GUI program corresponding to the two-screen display from the plural GUI programs stored on the hard disk drive 80 and causes the projector projection operation window W500 having the projection operation sub-window W600 including two screen sub-windows to be displayed, as the processing at the GUI control unit 75. As described above, in the embodiment(s) where the screen sub-windows are caused to correspond to display forms such as color, shape and size of the split display screen, the projection operation sub-window W600 may be changed in accordance with the change in the display form.

The screen sub-windows W610 to W640 constituting the projection operation sub-window W600 may be configured to display a thumbnail prepared by the CPU 70 on the basis of image data to be displayed in the corresponding split screen forming areas, stored in the RAM 88. For example, in the screen sub-windows W610 to W640, a display part to show a thumbnail may be provided at a position that does not obstruct the various buttons, or a translucent thumbnail prepared by reduction of luminance signals may be superimposed on the various buttons. Thus, the correspondence between the split screen forming areas and the screen sub-windows W610 to W640 may be easier to recognize and operations may be carried out more easily.

Now, the operation O360 will be described again. The teacher M selects "student A" in the participant display sub-window W520 by using the above GUI, then confirms the content of the display screen image PCT1 displayed in the preview sub-window W700, and clicks the projection button B613 in the top left screen sub-window W610. Similarly, the teacher M selects the students B to D, then confirms the contents of the display screen images PCT2 to PCT4 displayed in the preview sub-window W700, and clicks the projection buttons B623 to B643 in the top right, bottom right and bottom left screen sub-windows W620 to W640. These operations are instruction operations to cause the projector PR1 to project a quadrisected image including the display screen images PCT1 to PCT4 of the computers PC1 to PC4. These instructions are accepted by the CPU 70 as the processing at the combined image accepting unit 73.

When a split display instruction is accepted, the CPU 70 of the moderator computer PCm sequentially sends a data transmission request to the computers PC1 to PC4 (step S300).

As the CPU 20 of the computers PC1 to PC4 receives the data transmission request sent from the moderator computer PCm (S320), the CPU 20 sends image data of the display screen images PCT1 to PCT4 displayed in the display 65 of each computer to the moderator computer PCm, as the processing at the data transmitting unit 21 (step S321). The image data of the display screen images PCT1 to PCT4 are image data (for example, here, RGB image data) recorded in the VRAM 61 of the computers PC1 to PC4 when the data transmission request is received. The image data is sent together with setting information of the graphic controller 63 that is necessary to display the image data as an image. In the embodiment(s), however, where the graphic controller 63 of the computers PC1 to PC4, the graphic controller 113 of the moderator computer PCm and the graphic controller 153 of the projector PR1 have a uniform setting, the setting information of the graphic controller 63 does not have to be sent.

Having received the transmission from the computers PC1 to PC4, the CPU 70 of the moderator computer PCm receives the image data of the display screen images PCT1 to PCT4 sent from each of the computers PC1 to PC4 and stores the image data in association with the computer names into the RAM 85, as the processing at the data communication control unit 71 (step S301). Then, the CPU 70 generates combined image data that represents a combined image of the display screen images PCT1 to PCT4 in the RAM 85, as the processing at the image combining unit 72 (step S302).

After generating the combined image data, the CPU 70 sends the combined image data of the display screen images PCT1 to PCT4 to the projector PR1, as the processing at the data communication control unit 71 (step S304).

In the projector PR1, the CPU 120 receives the combined image data of the display screen images PCT1 to PCT4 sent from the moderator computer PCm and stores the combined image data into VRAM 151, as the processing at the data receiving unit 121. The graphic controller 153 reads the image data in the VRAM 151 and projects an image on the screen SC1 by using the projecting unit 155 (step S340). Thus, a quadrisected screen showing the display screen images PCT1 to PCT4 in the split screen forming areas SC11 to SC14, respectively, is displayed on the screen SC1, as illustrated in the left column in FIG. 9.

Figure 13:
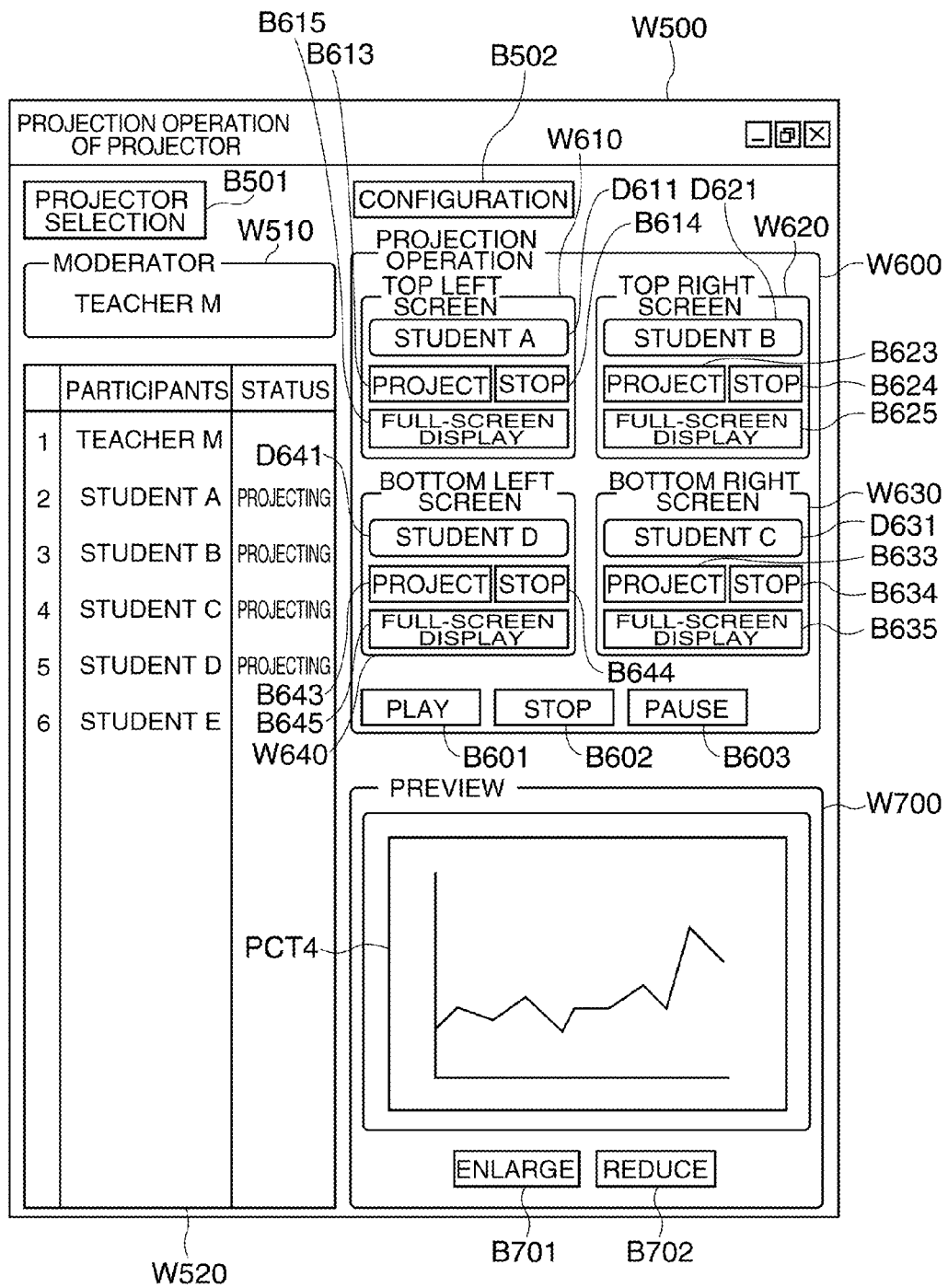
FIG. 13 illustrates an exemplary display where the projector projection operation window is being used.

In at least one embodiment, the projector projection operation window W500 is in a state as illustrated in FIG. 13. As shown in FIG. 13, "projecting" is shown in the participant display sub-window W520 as the status of the students A to D. In the projection operation sub-window W600, "students A to D" are shown in the projection user display parts D611, D621, D631, and D641, respectively. In the preview sub-window W700, the display screen image PCT4 corresponding to the student D is shown, who is the last to be selected in the participant display sub-window W520.

In step S302 and step S304, the CPU 70 receives image data from all of the computers PC1 to PC4, generates combined image data, and then sends the combined image data. However, the CPU 70 may generate and send combined image data at predetermined timing. In the former embodiment, an image of quadrisected display is immediately displayed on the screen SC1. In the latter embodiment, images in the process of generating the quadrisected display image are sequentially displayed as well.

In order to let the student A explain the display screen image PCT1 in more detail, the teacher M may operate the input system 101 to give an instruction to switch the display form of the image projected on the screen SC1 from the quadrisected screen of the display screen images PCT1 to PCT4 to the full-screen display of the display screen image PCT1 of the computer PC1 (operation O361). Specifically, the teacher M clicks the full-screen display button B615 in the top left screen sub-window W610 in the projector projection operation window W500 displayed on the display 115 of the moderator computer PCm.

In response to this instruction, in the moderator computer PCm, the CPU 70 accepts the instruction, as the processing at the image switching accepting unit 74, and sends the image data of the display screen image PCT1 recorded in the RAM 85 in association with the name of the computer PC1, to the projector PR1, as the processing at the data communication control unit 71 (step S305).

In the projector PR1, the CPU 120 receives the image data of the display screen image PCT1 sent from the moderator computer PCm and projects an image on the screen SC1 as in the above step S340, as the processing at the data receiving unit 121 (step S341). As such, the display screen image PCT1 is displayed as a full-screen image on the screen SC1, as illustrated in the left column in FIG. 9. In this manner, the student A using the computer PC1 may show, for example, the display screen image PCT1 displayed as a full-screen image on the screen SC1 to the other students and may give a detailed explanation about the display screen image PCT1 while confirming its content on the display 65 of the computer PC1.

While the display screen image PCT1 is projected in the full-screen display on the screen SC1 and the student A is explaining the display screen image PCT1, the teacher M may operate the input system 101 to give an instruction to prepare combined image data by replacing the display screen image PCT2 of the combined image data including the display screen images PCT1 to PCT4, with the display screen image PCT5 (operation O362). Specifically, the teacher M clicks the stop button B624 in the top right screen sub-window W620 corresponding to the split display area of the display screen image PCT2, in the projector projection operation window W500 displayed on the display 115 of the moderator computer PCm, and then selects "student E" in the participant display sub-window W520 and clicks the projection button B823 in the top right screen sub-window W620. This operation is in preparation for split display of the display screen images PCT1, PCT5, PCT3 and PCT4 after the explanation of the display screen image PCT1 is completed.

In response to this instruction, in the moderator computer PCm, the CPU 70 accepts the instruction as the processing at the combined image accepting unit 74, then specifies the IP address of the counterpart with reference to the client name profile 82 and the hourly profile 83, and sends a data transmission request to the computer PC5 (step S306).

As the CPU 20 of the computer PC5 receives the data transmission request sent from the moderator computer PCm (step S322), the CPU 20 sends the image data of the display screen image PCT5 displayed on the display 65 to the moderator computer PCm, as the processing at the data transmitting unit 21 (step S323). The transmission of image data in this step S232 and in the above step S321 may be carried out in a compressed image format such as, for example, JPEG in consideration of the communication load on the local area network LAN.

In response to the transmission from the computer PC5, the CPU 70 of the moderator computer PCm receives the image data of the display screen image PCT5 sent from the computer PC5 and stores the image data into the RAM 85 in association with the computer name, as the processing at the data communication control unit 71 (step S307). Then, the CPU 70 generates combined image data representing a combined image of the display screen images PCT1, PCT5, PCT3 and PCT4 from the image data of the display screen images PCT1, PCT5, PCT3 and PCT4 stored in the RAM 85, in the RAM 85, as the processing at the image combining unit 72 (step S308).

When the explanation of the display screen image PCT1 by the student A is finished, the teacher M may operate the input system 101 to give an instruction to switch the display form of the image projected on the screen SC1 from the full-screen display of the display screen image PCT1 to the split screen (operation O363). Specifically, the teacher M clicks the full-screen display button B615 in the top left screen sub-window W610 in the projector projection operation window W500 displayed on the display 115 of the moderator computer PCm.

In response to this instruction, in the moderator computer PCm, the CPU 70 accepts the instruction as the processing at the image switching accepting unit 74, and sends the combined image data of the display screen images PCT1, PCT5, PCT3 and PCT4 recorded in the RAM 85 to the projector PR1, as the processing at the data communication control unit 71 (step S310).

In the projector PR1, the CPU 120 receives the combined image data of the display screen images PCT1, PCT5, PCT3 and PCT4 sent from the moderator computer PCm, as the processing at the data receiving unit 121, and projects an image on the screen SC1 as in the above steps S340 and S341 (step S342). As such, on the screen SC1, a quadrisected screen showing the display screen images PCT1, PCT5, PCT3 and PCT4 in the split screen forming areas SC11 to SC14, respectively, is displayed as shown in the left column in FIG. 10. Thus, the screen switching processing according to at least one embodiment is complete.

In at least one embodiment, in response to a data transmission request from the moderator computer PCm, the computers PC1 to PC5 send image data recorded in the VRAM 61 at the time of receiving the transmission request, to the moderator computer PCm. However, the computers PC1 to PC5 are not limited to such a configuration. For example, the computers PC1 to PC5 may send image data recorded in the VRAM 61 to the moderator computer PCm at periodic timing intervals. Alternatively, as another example, the computers PC1 to PC5 may send image data to the moderator computer PCm every time data in the VRAM 61 is rewritten. With such configurations, every time the moderator computer PCm receives image data, the image displayed on the screen SC1 may be updated to the latest image by the method in at least one previously described embodiment. Thus, even in the embodiment where there is a change in the display screen images PCT1 to PCT5 of the computers PC1 to PC5 or in the case where the display screen images PCT1 to PCT5 are dynamic images, the display screen images PCT1 to PCT5 may be displayed on the screen SC1 while the change in the display screen images PCT1 to PCT5 is followed. When such configurations are employed, if the computers PC1 to PC5 send only the rewritten data part, the communication load on the local area network LAN may be reduced.

In certain previously described embodiment(s), the display screen images PCT1 to PCT5 are projected on the screen SC1. However, it is also possible to project the display screen image PCTm of the moderator computer PCm by selecting the teacher M in the participant display sub-window W520 in the projector projection operation window W500. In this embodiment, the teacher M can display desired image data on the display 115 and then minimize the projector projection operation window W500.

In certain previously described embodiment(s), the images projected on the screen SC1 are the display screen images PCT1 to PCT5 of the computers PC1 to PC5. However, the images to be projected are not limited to these and can be any image that is handled by the computers PC1 to PC5. For example, in an embodiment where the computers PC1 to PC5 are equipped with a web camera, images shot by the web camera may be projected. Alternatively, designated image data, of image data stored in each of the computers PC1 to PC5, may be projected without being displayed on the display 65 of the computers PC1 to PC5.

In certain previously described embodiment(s), a projector is used as the image display apparatus in the conference system 10. However, various display devices such as, for example, a plasma display, liquid crystal display and organic EL display may be used. Moreover, though the computers PC1 to PC5 are used as exemplary terminals in the conference system 10, various communication terminals such as, for example, a mobile phone and PDA (personal digital assistant) may be used. In certain previously described embodiment(s), the moderator computer PCm functions as a server that receives image data from the computers PC1 to PC5, carries out processing such as generating a combined image and sends the combined image to the projector PR1. However, the moderator computer PCm operated by the teacher M and a server may be separately installed. As such, the load on the moderator computer PCm may be reduced and the performance of the moderator computer PCm can be enhanced. Moreover, in such embodiment, the hourly profile 33 stored on the hard disk drive 30 of the computers PC1 to PC5, and the hourly profile 83 and the class makeup profile 84 stored on the hard disk drive 80 of the moderator computer PCm may be collectively managed by the server. The computers PC1 to PC5 and the moderator computer PCm may access the server every time the connection processing shown in FIG. 5 and FIG. 6 is carried out, and then read a necessary profile. Of course, in the embodiment where the moderator computer PCm functions as a server, the moderator computer PCm may collectively manage the profiles. As such, the timetables for the teacher M and the students A to E, the makeup of each class and the like may be collectively managed and may be easier to manage.

In the conference system 10 of certain previously described embodiments, the computers PC1 to PC5 specify the moderator computer PCm from plural moderator computers as a connection destination in accordance with the hourly profile 33 stored on the hard disk drive 30, and automatically make a connection request to the moderator computer PCm. As such, the students A to E do not have to carry out an operation to select a connection destination. Moreover, since a connection request is automatically made, the students A to E are prevented from carrying out an operation to a wrong connection destination.

In the conference system 10 of certain previously described embodiments, the moderator computer PCm determines whether a connection in response to a connection request received from the computers PC1 to PC5 is possible or not, in accordance with the client name profile 82 and the hourly profile 83 stored on the hard disk drive 80. As such, a connection is not established in response to a mistakenly made connection request. Moreover, the teacher M does not have to check the class to which the student who has made a connection request belongs, so as to determine whether a connection is possible or not, and does not have to carry out a designation operation about whether to permit or reject a connection.

Although certain embodiments have been described above, the disclosure is not limited to such embodiments. Various changes and modifications may be made without departing from the scope and spirit of the disclosure. For example, the disclosure is not limited to the conference system 10 described in certain previously described embodiments but can also be configured as various server client systems. Moreover, embodiments may also be realized in the form of a connection method to establish connection between the terminals and the server, and in the form of a computer program, a recording medium and so on for the terminals to request connection to the server. Accordingly, those with skill in the art will readily appreciate that embodiments in accordance with the present disclosure may be implemented in a very wide variety of ways. This disclosure is intended to cover any adaptations or variations of the embodiments discussed herein. Therefore, it is manifestly intended that embodiments in accordance with the present disclosure be limited only by the claims and the equivalents thereof.

What is claimed is:

1. A computing device, comprising:
 a network interface that receives terminal information corresponding to a terminal connected to a network, the terminal information being received from the terminal;
 a storage device that stores profile information defining that the terminal is permitted to connect to the computing device;
 a central processing unit that:
  refers to the received terminal information and the stored profile information, and
  determines that the terminal is permitted to connect to the computing device;
 a display that displays a participant display area, the participant display area displaying a client name that corresponds to the terminal; and
 an input mechanism that accepts a user operation selecting the client name displayed in the participant display area to designate the terminal,
 wherein:
  the terminal provides image data to the computing and device,
  the computing device supplies the image data provided by the terminal to an image display apparatus connected to the network,
  the stored profile information comprises an hourly profile and a class makeup profile stored on the storage device, and
  determining that the terminal is permitted to connect to the computing device comprises the central processing unit determining that a student who has sent a connection request to the computing device is a student belonging to a class corresponding to a present time defined in the hourly profile, by referring to the hourly profile and the class makeup profile.

2. The computing device of claim 1, wherein:
the display displays a display operation sub-window, and
the display operation sub-window comprises a plurality of split sub-windows respectively including user display parts, at least one of the user display parts displaying the selected client name.

3. The computing device of claim 2, wherein a layout of the split sub-windows in the display operation sub-window corresponds to a layout of a split display screen dividing a screen on which an image from the image display apparatus is shown.

4. The computing device of claim 2, wherein each of the split sub-windows includes a display button, a stop button, and a full-screen display button.

5. The computing device of claim 2, wherein:
the input mechanism includes a mouse, and
the participant display area and the display operation sub-window accept drag and drop operations of the client name to designate the terminal as the supplier of the image data.

6. A method for controlling a computing device, the method comprising:
receiving terminal information corresponding to a terminal connected to a network, the terminal information being received from the terminal;
storing profile information on a storage device, the profile information defining that the terminal is permitted to connect to the computing device;
referring to the received terminal information and the stored profile information;
determining that the terminal is permitted to connect to the computing device;
displaying, on a display of the computing device, a participant display area that displays a client name that corresponds to the terminal;
accepting a user operation selecting the client name displayed in the participant display area to designate the terminal;
receiving image data from the terminal; and
supplying, to an image display apparatus connected to the network, the image data provided by the terminal, wherein
the stored profile information comprises an hourly profile and a class makeup profile stored on the storage device,
determining that the terminal is permitted to connect to the computing device comprises determining that a student who has sent a connection request to the computing device is a student belonging to a class corresponding to a present time defined in the hourly profile, by referring to the hourly profile and the class makeup profile, and
the method is performed by the single computing device.

7. A computer program product stored on a storage device and executable by a computing device, the computer program product allowing the computing device to execute a process comprising:
receiving terminal information corresponding to a terminal connected to a network, the terminal information being received from the terminal;
storing profile information on a storage device, the profile information defining that the terminal is permitted to connect to the computing device;
referring to the received terminal information and the stored profile information;
determining that the terminal is permitted to connect to the computing device;
displaying, on a display of the computing device, a participant display area that displays a client name that corresponds to the terminal;
accepting a user operation selecting the client name displayed in the participant display area to designate the terminal;
receiving image data from the terminal; and
supplying, to an image display apparatus connected to the network, the image data provided by the terminal, wherein
the stored profile information comprises an hourly profile and a class makeup profile stored on the storage device,
determining that the terminal is permitted to connect to the computing device comprises determining that a student who has sent a connection request to the computing device is a student belonging to a class corresponding to a present time defined in the hourly profile, by referring to the hourly profile and the class makeup profile, and
the process is executed by the single computing device.

8. The computing device of claim 1, wherein:
the number of central processing units in the computing device is one.

9. The method of claim 6, wherein:
the computing device comprises a central processing unit;
the central processing unit both:
determines that the terminal is permitted to connect to the computing device by comparing the received terminal information and the stored profile information;
reads a GUI program stored on the storage device that causes the display to display the participant display area by using a graphic controller.

10. The method of claim 9, wherein:
the central processing unit functions as an image combining unit.

11. The method of claim 9, wherein:
the GUI program causes the display to display a display operation sub-window, and
the display operation sub-window comprises a plurality of split sub-windows respectively including user display parts, at least one of the user display parts displaying the selected client name.

12. The method of claim 11, wherein:
the computing device is configured to accept user input designating a terminal for each respective split sub-window, each designation indicating that the respective terminal is a supplier of image data for the respective split sub-window.

13. The method of claim 12, wherein:
each split sub-window in the plurality of split sub-windows includes a project button that instructs image data from a respective terminal designated for the split sub-window to be displayed by the image display apparatus.

14. The method of claim 13, wherein:
the relative orientation of the split sub-windows on the display is the same as the relative orientation of the image data from the respective terminals as displayed by the image display apparatus.

15. The method of claim 13, wherein:
each split sub-window in the plurality of split sub-windows includes a full-screen display button that instructs image data from a terminal designated for the split sub-window to be displayed by the image display apparatus in full-screen mode.

16. The method of claim 9, wherein:
the display includes a status area indicating which client names in the participant display area correspond to image data currently being displayed by the image display apparatus.

17. The method of claim 9, wherein:
the display includes a preview sub-window where, when participants in the participant display area are selected, preview of image data corresponding to the selected participants is shown regardless of contents displayed by the image display apparatus.

18. The method of claim 11, wherein:
the participant display area and the display operation sub-window accept drag and drop operations of the client name to designate the terminal as the supplier of the image data.

* * * * *